United States Patent [19]
Mori et al.

[11] Patent Number: 5,366,629
[45] Date of Patent: Nov. 22, 1994

[54] LIQUID RECOVERING APPARATUS

[75] Inventors: Yozi Mori; Motonori Suzuki, both of Misato; Hiroshi Kikuchi; Kenrou Motoda, both of Tokyo, all of Japan

[73] Assignees: Motoda Electronic Industry Co., Ltd., Tokyo; World Chemical Co., Ltd., Saitama, Japan

[21] Appl. No.: 32,981

[22] Filed: Mar. 18, 1993

[30] Foreign Application Priority Data

Jan. 14, 1993 [JP] Japan .................................. 5-005121

[51] Int. Cl.$^5$ .......................................... E02B 15/10
[52] U.S. Cl. ................... 210/242.3; 210/923; 422/256
[58] Field of Search ............... 422/265, 257, 258, 259, 422/269, 256; 210/242.3, 923, 512.1, 538, 540

[56] References Cited

U.S. PATENT DOCUMENTS

| | | | |
|---|---|---|---|
| 4,142,972 | 3/1979 | Nebeker et al. | 210/242.3 X |
| 4,295,975 | 10/1981 | Walin | 210/923 X |
| 4,301,008 | 11/1981 | Baffert et al. | 210/242.3 X |
| 4,378,291 | 3/1983 | Ward et al. | 210/242.3 |
| 4,595,510 | 6/1986 | Winbladh et al. | 210/242.3 X |
| 5,030,342 | 7/1991 | Ortega | 210/242.3 X |
| 5,118,412 | 6/1992 | Schmidt | 210/693 X |

FOREIGN PATENT DOCUMENTS

| | | |
|---|---|---|
| 53-26422 | 8/1978 | Japan . |
| 4350211 | 12/1992 | Japan . |
| 5214722 | 8/1993 | Japan . |

*Primary Examiner*—Amalia L. Santiago
*Attorney, Agent, or Firm*—Bauer & Schaffer

[57] ABSTRACT

A container is supported floating in a liquid by floats; an inflow gate is loosely fitted about the container. The inflow gate has a sloping face for introducing liquid into the container. A discharge is provided for discharging the liquid accumulated in the main body bath. Floating substances collected on the sloping face of the inflow gate are raked and pushed into the main container by a raking machine arranged on the sloping face of the inflow gate and a pressure screw arranged on the sloping face of the inflow gate and a pressure screw arranged in the main container.

11 Claims, 9 Drawing Sheets

# LIQUID RECOVERING APPARATUS

BACKGROUND OF THE INVENTION

1. Field of the Invention

The present invention relates to a liquid recovering apparatus for use in recovering outflow oil such as crude oil, scum in sewage disposal plants, food producing plants and so on, coolant oil in machining centers, floating oil in grease removal processes for plating and so on.

2. Description of the Prior Art

In recent years, there have occurred a number of ocean polluting accidents due to outflowing crude oil or combustible oil caused by the stranding, sinking and so on of ships, particularly, tankers. It has therefore been strongly desired to recover such outflowing oil as much as possible to achieve preservation of the environment.

A variety of apparatuses for recovering outflow oil have been developed to respond to such requests, and Japanese Patent Publication No. 53-26422 (1) issued to the present assignee has been known. The present assignee has also filed Japanese Patent Applications Nos. 3-123712(2) and 4-16771 (3) . The techniques described in these documents will be explained below.

In known Japanese Patent Publication No. 53-26422, an oil accumulating chamber is arranged on an upper portion of a separator in a bath at a level higher than the liquid surface for recovering oil by means of a vacuum pump. Water is separated and sent to an overflow tube arranged in an internal vessel and discharged by a discharging pump.

In Japanese Patent Application No. 3-123712 by the present assignee, liquid including low specific gravity oil and so on entering from an inlet port of an inflow guide enters from an inlet port of a bath into the inside thereof and is impeded from passing by obstructive plates, whereby oil and other components are separated by the difference in specific gravity, and the oil is accumulated in a separator bath. When a predetermined amount of liquid is accumulated, oil is recovered from an extracting tube, water enters an internal tube from a separator, flows into an overflow tube and is once isolated. Then, the water in the overflow tube alone is discharged to the outside.

Japanese Patent Application No. 4-16771 by the present assignee adjusts a fixing position of a guide float of an inflow guide to freely set the level of a guide inflow gate. Further, a fixing position of a main body float provided for a main body bath may also be adjusted to freely set the level of a main body inflow gate. In this way, clots of oil, scum and so on can be relatively easily recovered by adjusting the levels of the guide and main body inflow gates in accordance with a quantity of such clots and scum. Specifically, if there are many clots of oil, the levels of these gates may be set to be low.

The prior art examples (1) and (2) described above are both adapted to efficiently recover only oil and therefore are convenient for the case where oil slick is prevented from extending by an oil fence or the like which surrounds oil on the water surface. However, they are complicated in structure, limited in the processing capability, and too large to bring with ease, so that they tend to delay attending to an urgent case. Specifically, these prior art examples are not sufficient to recover as fast as possible oil slick, which is going to extend on the water surface, so as to prevent the oil slick from extending.

Further, these apparatuses cannot recover clots of highly viscous oil and scum which does not smoothly path through the inlet port, or these clots and scum may block the inlet port, which results in hindering the apparatus from recovering liquid including oil.

Although the prior art example (3) can recover liquid even including clots of oil, scum or the like by adjusting the level of a guide inflow gate, clots of oil having a viscosity above a predetermined value, excessively grown scum and so on does not smoothly pass through the inlet port and therefore cannot be recovered. Further, the adjustment of the fixing position of the guide float for adjusting the level of the guide inflow gate must be made for all guide floats provided in the apparatus. Therefore, this apparatus requires an excessive amount of manipulation particularly when applied to the recovery of floating oil in grease removal process for plating which requires frequent adjustments of the level of numerous guide inflow gates.

OBJECTS AND SUMMARY OF THE INVENTION

In view of the problems mentioned above, it is an object of the present invention to provide a liquid recovering apparatus which is capable of easily attending to an emergent accident, adjusting an inflow level, and recovering and separating highly viscous oil susceptible to attach to an inlet port and largely grown scum without the inlet port being blocked by them.

To achieve the above object, the present invention provides a liquid recovering apparatus comprising: a main body bath floating in liquid by the action of main body floats and having an inlet port; an inflow gate loosely fitted in the outer periphery of the main body bath and having a sloping face which gradually rises toward the main body bath, for introducing a liquid into the main body bath through the inlet port; and a discharge section arranged in a lower part of the main body bath for discharging liquid accumulated in the main body bath.

The above and other objects, features and advantages of the present invention will become apparent from the following detailed description of the preferred embodiments when read in conjunction with the accompanying drawings.

DESCRIPTION OF THE PREFERRED EMBODIMENTS

A liquid recovering apparatus according to one embodiment of the present invention will hereinafter be described with reference to the accompanying drawings.

Figure 1:
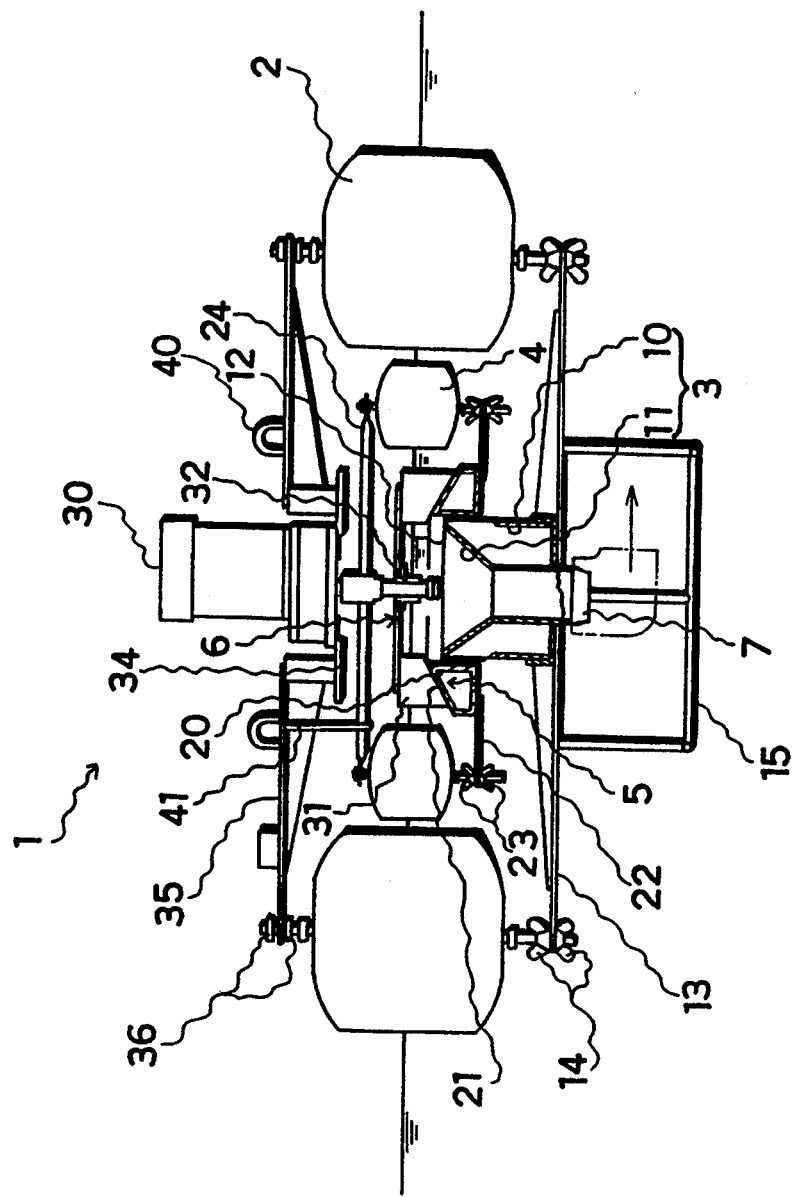
FIG. 1 is a lateral view showing a liquid recovering apparatus according to an embodiment of the present invention.

Referring first to FIG. 1, a liquid recovering apparatus 1 comprises, as main constituents, a main body bath 3 which floats in liquid by means of main body floats 2; an inflow gate 5 loosely fitted in the outer peripheral wall of the main body bath 3 and floating in liquid by means of guide floats 4; a raking apparatus 6 arranged on the inflow gate 5; and a discharge pipe (discharge section) 7.

The main body bath 3 has a double structure in which a conical bath 11 is arranged in a cylindrical body 10, the upper side wall of which serves, over all the periphery, as an inlet port 12 such that a liquid enters through this inlet port into the main body bath 3. This inlet port 12 may be of any shape as long as a liquid including oil extending over a region can pass therethrough and enter into the main body bath 3. On the lower end face of the cylinder body 10 there are arranged four brackets 13, and a lower end of the main body float 2 is adjustably mounted by two thumb screws 14 at the tips of the brackets 13, whereby a draft position of the main body bath 3 is freely variable. It should be noted that the number of main body floats may be increased to three, or five and so on in accordance with the weight and size of the liquid recovering apparatus 1. These brackets 13 are provided with a stand 15 for installing on the land which protects the discharge pipe 7 and hoses, pipes and so on connected thereto when the apparatus is placed on the land.

Figure 3:
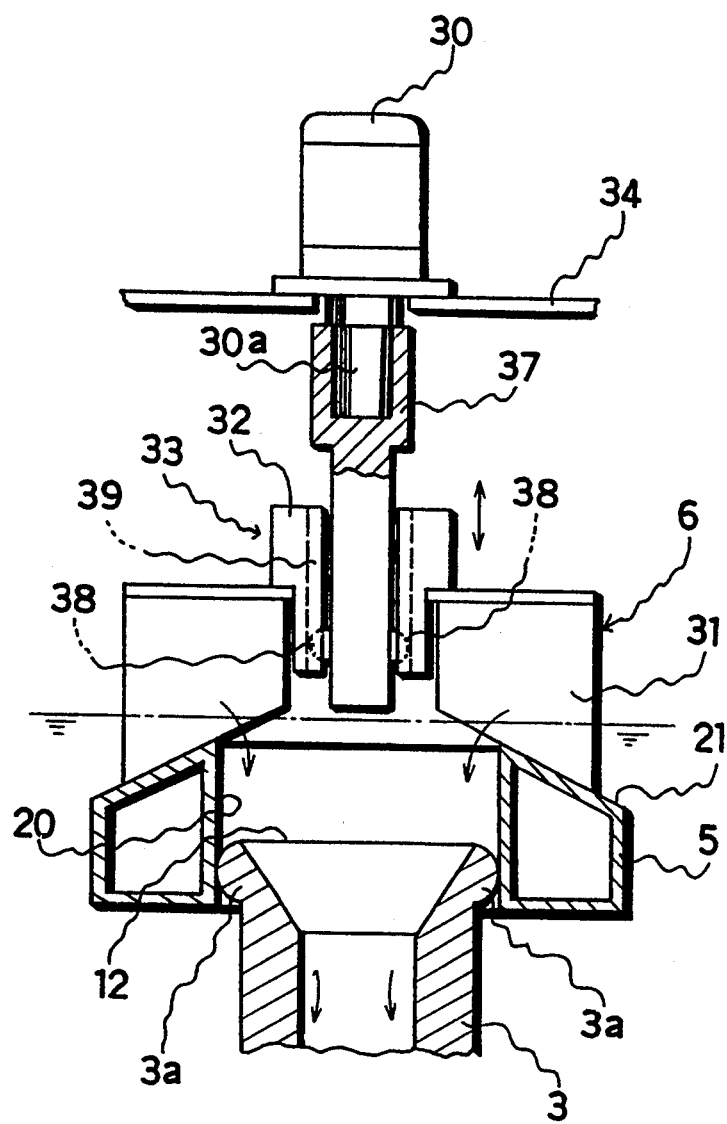
FIGS. 3 and 4 are partially sectioned lateral views showing a coupler of a raking machine.
Figure 4:
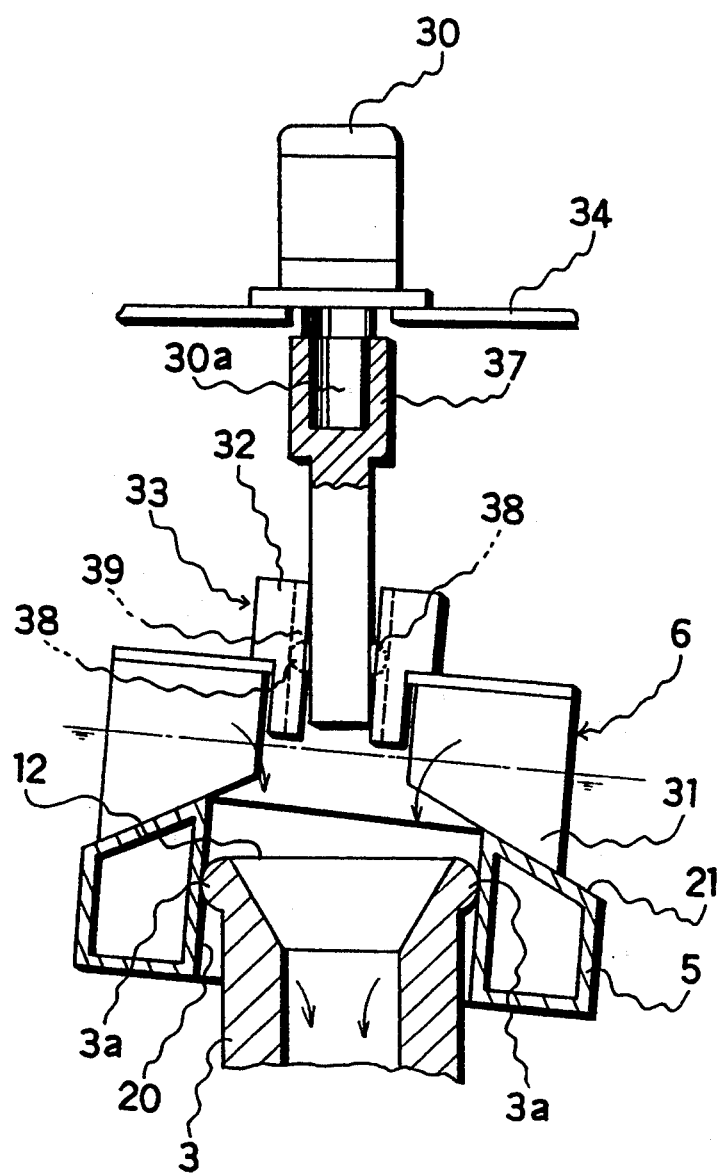

The inflow gate 5, as shown in FIGS. 3 and 4, comprises a sloping face 21 in the shape of a conical collar on the upper end of a cylindrical body 20 having a diameter slightly larger than a semi-circular protrusion 3a formed on the upper end outer periphery of the main body bath 3. The cylindrical body 20 is arranged such that a liquid flows into the inside from the entire upper end perimeter of the cylindrical body 20. On the lower end face of the inflow gate 5 there are arranged four brackets 22 respectively at locations above the four brackets 13 of the main body floats 2. Then, each guide float 4 has its lower end side adjustably mounted on the tip of each bracket 22 by two thumb screws 23. This inflow gate 5 therefore floats in liquid independently of the main body bath 3 and is able to adjust an amount of liquid flowing into the main body bath 3 through the inflow gate 5 by varying the fixing positions of the guide floats 4 on the brackets 22 with the thumb screws 23, without being influenced by fluctuations in the floating level of the main body bath 3 due to changes in the liquid amount accumulated in the main body bah 3. It should be noted that the upper end sides of the four guide floats 4 are coupled to bars 24 to serve as vibration stoppers for the guide floats 4.

The raking machine 6 comprises a rotating or driving section 30 supported by the main body float 2; raking blades 31 for raking floating substances on the sloping face 21 of the inflow gate 5 to a central portion; and a coupler 33 connecting the rotating axis of the raking blades 31 with the shaft of the rotating section 30 in a manner forwardly and backwardly movable in the axial direction by a predetermined distance and also rotatable by a predetermined angular distance with respect to this axis so as transmit the rotation of the rotating section 30 to the raking blades 31. The rotating section 30 employs a variable speed to allow the rotational speed of the raking blades to be changed in accordance with properties of floating substances, and is placed on a supporting stand 34. This supporting stand 34 is provided with four brackets 35. On the tips of the brackets upper ends of the main body floats 2 are adjustably mounted respectively by two mounting screws 36, whereby the level of the mounted position of the rotating section 30 is adjustable.

The raking blades 31 are placed on the sloping face 21. Generally, the number of the raking blades 31 is three, however, at least two blades are sufficient. These raking blades 31 are connected to the rotating section 30 by way of the coupler 33 which is a spline joint in this particular embodiment. As shown in FIGS. 3 and 4, a semi-circular protrusion 38 is formed on a shaft fixed to a shaft 30a of the rotating section 30, and a rotating shaft 32 of the raking blades 31 is formed with a spline groove 39 in the inner peripheral surface thereof. By fitting the protrusion 38 into the spline groove 30, the rotating section 30 can transmit the rotation to the raking blades 31 even if the raking blades 31 forwardly or backwardly shift in the axial direction by the predetermined distance or rotates by the predetermined angular distance with respect to this axis. A similar movement to that of the coupler 33 is also permitted by the cylindrical body 20 of the inflow gate 5 and the protrusion 3a of the main body bath 3.

The discharge pipe 7 is arranged on the bottom of the conical bath 11 of the main body bath 3 and generally connected to the suction side of a pump directly or indirectly through a suction pipe in order to discharge a liquid to the outside.

Figure 2:
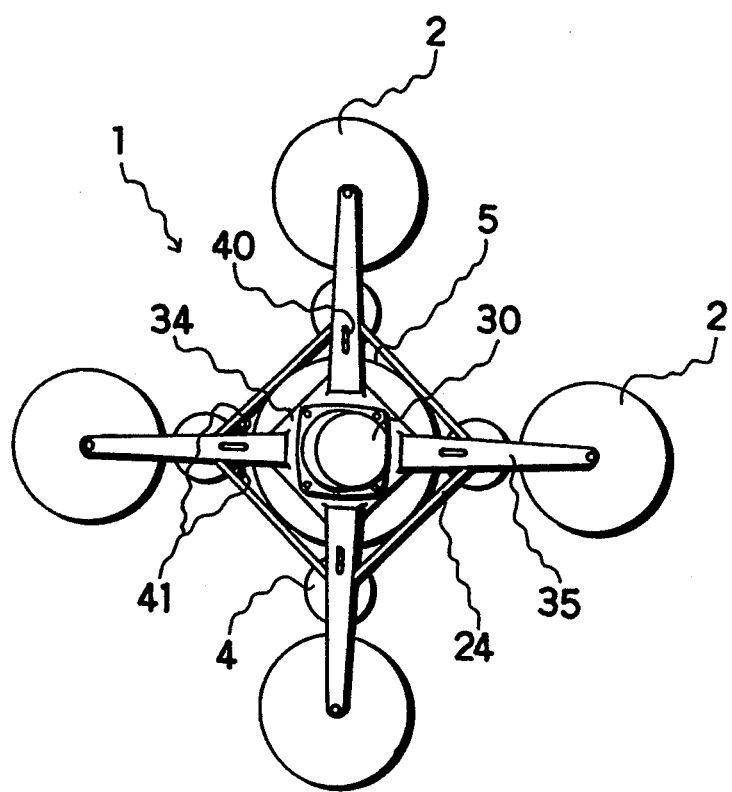
FIG. 2 is a partially sectioned plan view showing the liquid recovering apparatus.

In addition, in FIGS. 1 and 2, reference numeral 40 designates a suspender, and 41 a stop bar. These are used to always place the guide floats 4 right above the brackets 13 of the main body float 2 so as to prevent floating substances from flowing toward the inflow gate 5.

Next, the installation and the operation of the liquid recovering apparatus structured as described above will be explained.

First, the liquid recovering apparatus 1 and equipment associated therewith are transported to a location on the land near a water area in which oil or the like is outflowing. The associated equipment comprises a recovering pump, a liquid separating apparatus, a recovered oil accumulating tank, and so on. The liquid separating apparatus is first installed in the land area, the recovering pump and the recovered oil accumulating tank are subsequently installed, and a power supply unit is connected to the liquid recovering apparatus 1, the recovering pump and so on. Next, necessary settings, such as loosely fitting the inflow gate 5 into the main body bath 3 and so on, are performed. Also performed are necessary setting with the associated equipment, e.g., connecting the discharge pipe 7 with the recovering pump and so on. Then, the liquid recovering apparatus 1 is floated in a substantially central position of oil extending over the water area. Then, the fixing positions of the main body float 2 and the guide float 4 are adjusted, and the installed level of the inlet port 12 of the main body bath 3 and the inflow gate 5 are adjusted for this water area, thus completing the installation of the liquid recovering apparatus 1 and the equipment associated therewith as well as the preparation for the operation, followed by turning on the power supply unit. Water including oil flows into the conical bath 11 in the main body bath 3 beyond the inflow gate 5 and through the inlet port 12, enters the liquid separating apparatus through the discharge pipe 7 by the recovering pump, where water and oil are separated. The separated water is returned to the water area while the oil is accumulated in the recovered oil accumulating tank. However, if floating substances such as clots of highly viscous oil or largely grown scum are present, they cannot enter the main body bath 3 beyond the inflow gate 5, even if they are guided by the sloping face 21, and are left on the sloping face 21, which results in subsequently hindering oil from being recovered. To attend to this problem, the rotating speed of the raking blades 31 of the raking machine 6 is set in accordance with the condition of floating substances, and the raking blades 31 are rotated by the rotating section 30 at the set rotational speed, thereby forcedly raking such floating substances to a central portion and putting them into the main body bath 3, whereby the sloping face 21 always remains in a smooth condition to enable water including oil to be always recovered.

Figure 5:
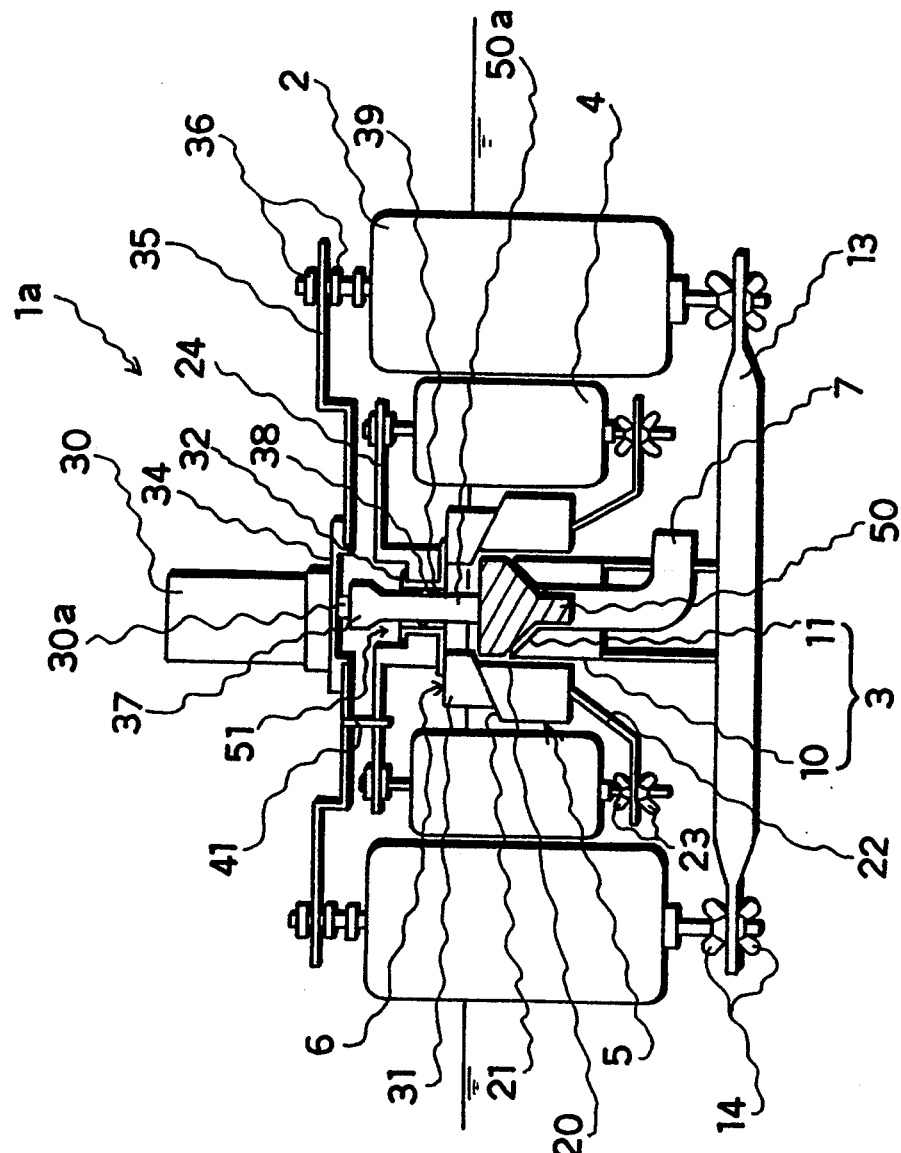
FIG. 5 is a lateral view, similar to FIG. 1, showing a liquid recovering apparatus according to another embodiment of the present invention.

FIG. 5 illustrates another embodiment of the present invention. A liquid recovering apparatus 1a of this embodiment differs from the foregoing embodiment shown in FIGS. 1–4 in that a rotating section 30 is directly coupled to a pressure screw 50 arranged in a main body bath 3. A coupler 51, which is a spline joint similar to the coupler 33, is interposed between a shaft 50a of the pressure screw 50 and a rotating shaft 31 of a raking machine 6 so that the pressure screw 50 forces floating substances which are hardly carried by the raking operation of the raking machine 6 to enter the main body bath 3 and go out through a discharging pipe 35 to the outside. The rest of the structure and actions of the present embodiment are similar to the foregoing embodiment shown in FIGS. 1–3, so that like parts in FIG. 5 are designated the same reference numerals as those in FIGS. 1–3, and explanation thereof will be omitted.

Figure 6:
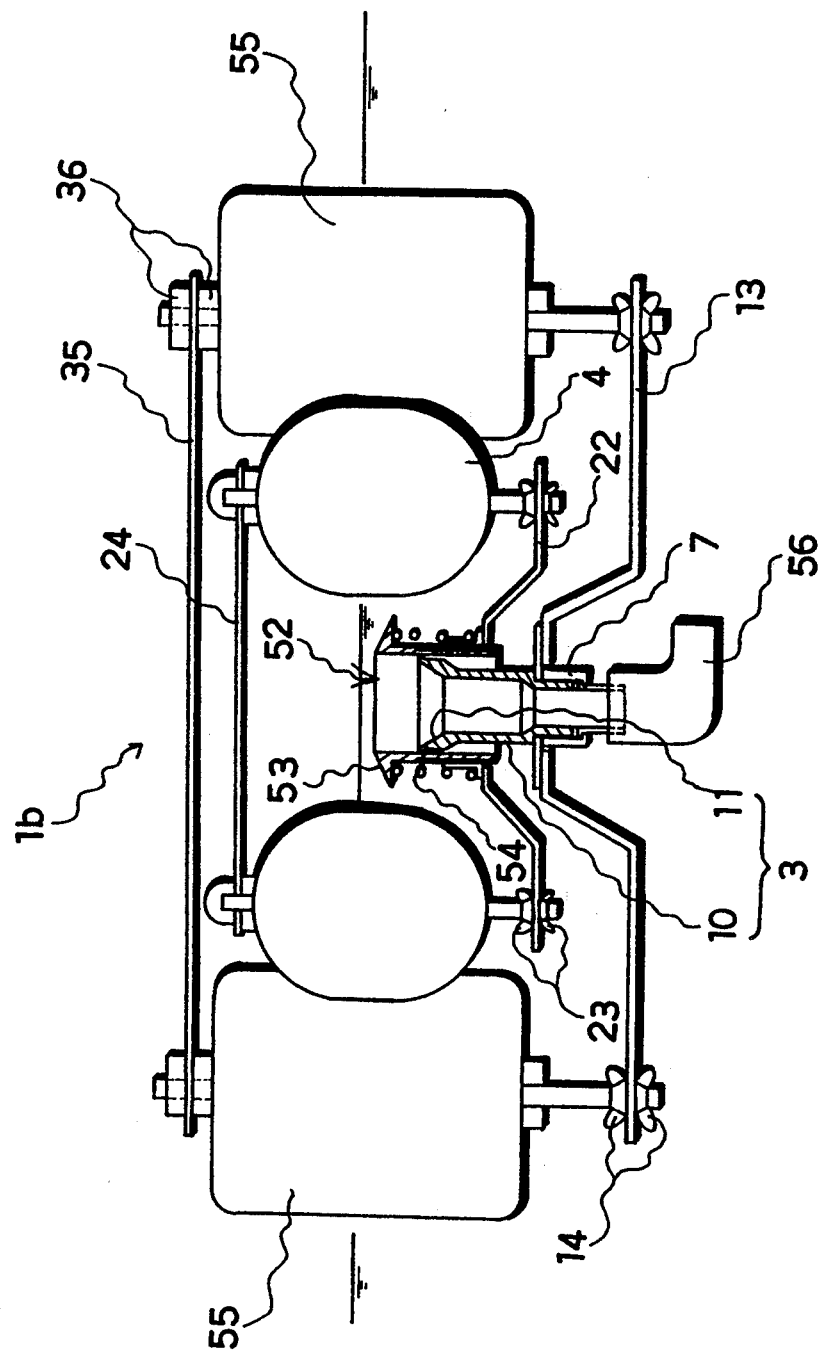
FIGS. 6 and 7 are lateral views, similar to FIG. 1, showing a liquid recovering apparatus according to a further embodiment of the present invention.
Figure 7:
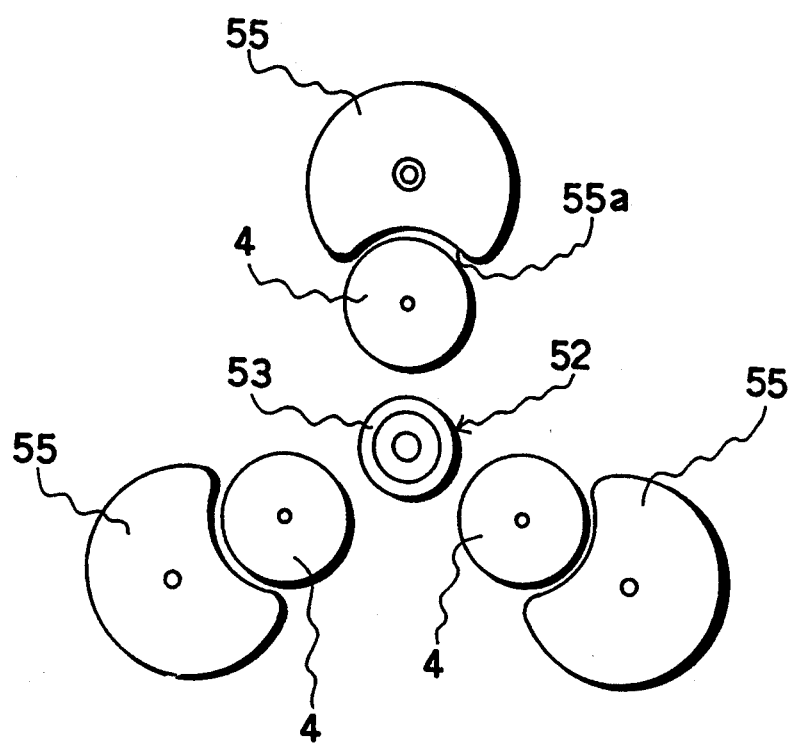

FIGS. 6 and 7 illustrate a further embodiment of the present invention. A liquid recovering apparatus 1b of this embodiment differs from the foregoing embodiment shown in FIGS. 1–4 in that the former is not provided with the raking machine 6 and the thumb screws 23 for adjusting the fixing position of the inflow gate 5 on the guide float 4 (however, the thumb screws 23 may be provided since they facilitate rough adjustment of the liquid recovery apparatus 1b when it is first floated on the water surface), and instead an inflow gate 52 is screwed to a bracket 22, a spring 54 is interposed between the bracket 22 and a sloping face 53 of the inflow gate 52, a recess 55a is formed in a main body float 55, and part of a guide float 4 is inserted into the recess 55a. Since the level of the gate can be adjusted by rotating the inflow gate 52, the thickness of liquid to be permitted to enter the gate 52 can be freely and easily adjusted. Also, an urging force of the spring 54, after the adjustment, allows the inflow gate 52 to freely rotate to prevent the level of the gate from varying. This urging force also prevent the guide float 4 from impeding oil or the like from entering beyond the inflow gate 52. Incidentally, reference numeral 56 in FIG. 6 designates a universal joint which is provided to allow a hose in any shape to be connected without causing variations in the level of the inflow gate 52. The rest of the structure and the operations of this embodiment are similar to those of the foregoing embodiment described in connection with FIGS. 1–3, so that like parts in FIGS. 6 and 7 are designated the same reference numerals as those in FIGS. 1–3, and explanation thereof will be omitted.

Figure 8:
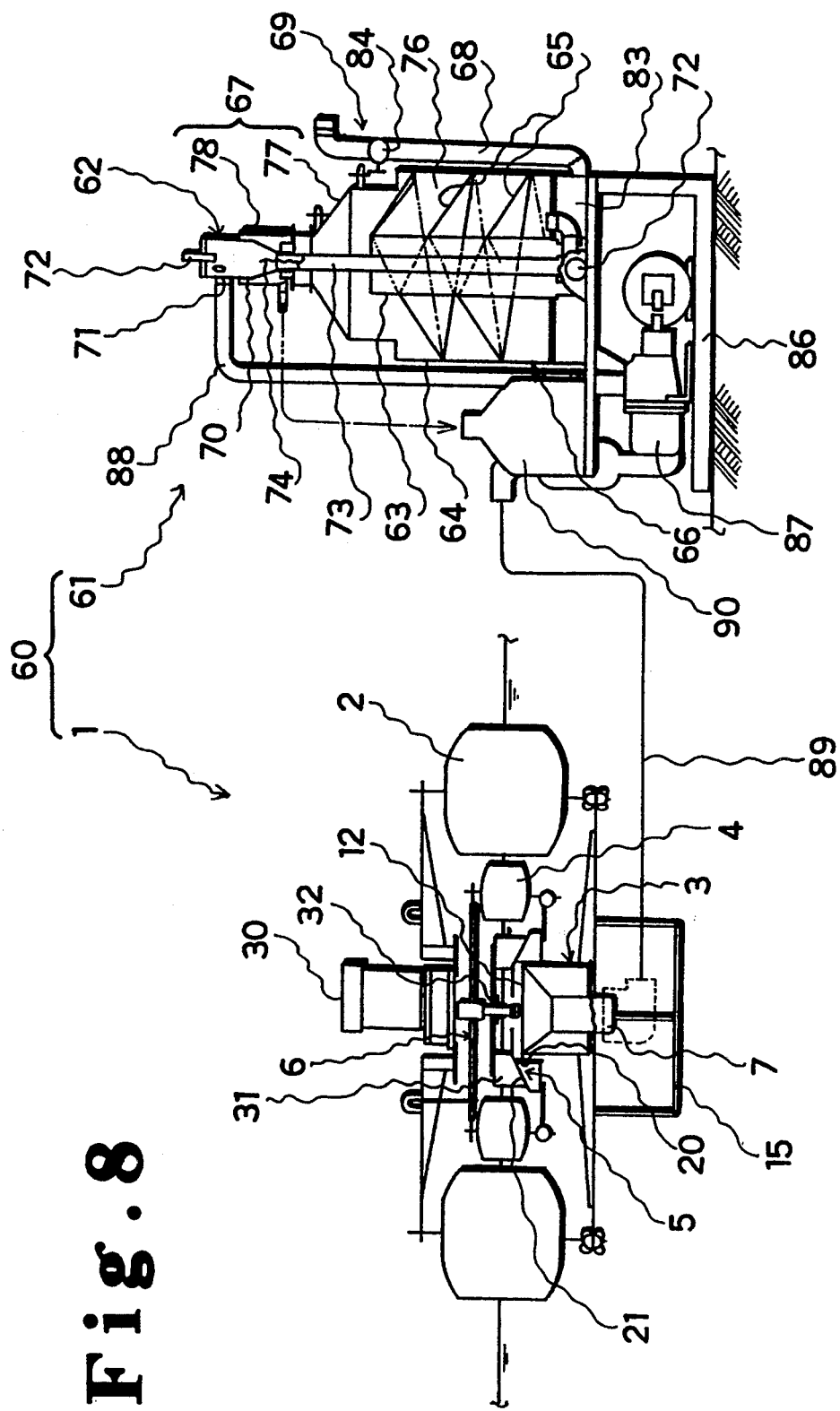
FIG. 8 is a diagram showing the structure of a yet further embodiment of the present invention.
Figure 9:
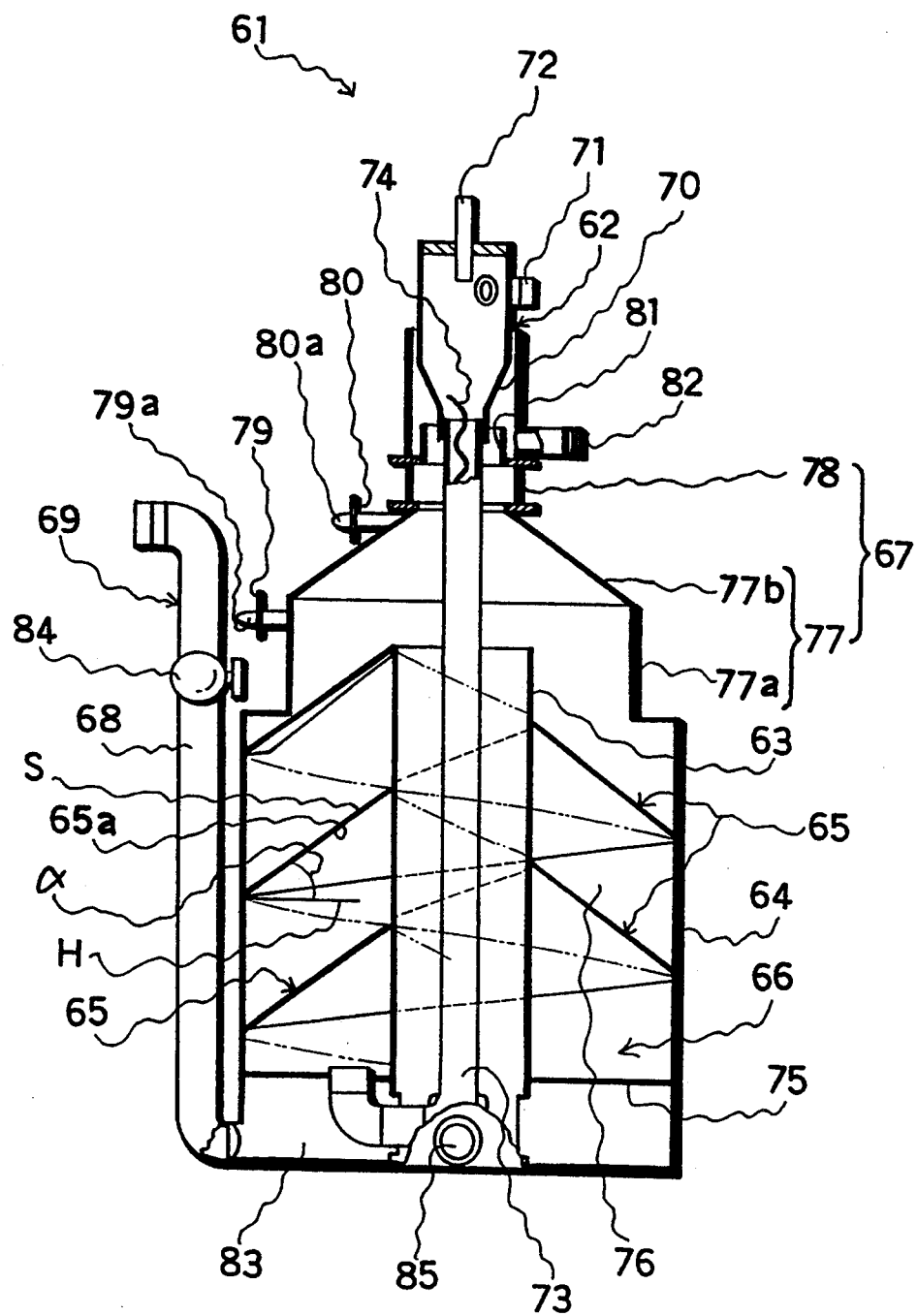
FIG. 9 is a partially sectioned lateral view showing a separating means.

FIGS. 8 and 9 illustrates a further embodiment of the present invention. A liquid recovering apparatus 60 of this embodiment differs from the embodiment shown in FIGS. 1–3 in that the latter is additionally provided with a separating means 61. More specifically, the separating means 61 comprises a cyclone section 62 for separating gas and liquid; specific gravity difference separating section 66 having an inner cylinder 63 and an outer cylinder 64 concentrically arranged below the cyclone section 62 and a spiral wall 65 arranged between these inner and outer cylinders 63 and 64 for receiving recovered oil and so on from a lower part thereof, after passing through the cyclone section 62, and separating into liquids which are different from each other in specific gravity; an accumulated liquid extracting section 67 positioned above the specific gravity difference separating section 66 for accumulating a liquid with low specific gravity and discharging the same to the outside; and an overflow section 69 connecting the inner cylinder 63 with a discharge pipe 68 for discharging a liquid with high specific gravity.

The cyclone section 62 has an introducing port 71 formed in a side face of a cyclone body 70 in the shape of a cylinder having a cone attached on the bottom face thereof in the tangential direction and an air drain 72 on the upper face of the cyclone body 70. One end of an introducing pipe 73 extending through the inner cylinder 63 is mounted to a lower part of the cyclone body 70, and the other end of the introducing pipe 73 is open to a lower part of the specific gravity difference separating section 66. Then, a screw 74 is disposed on the introducing pipe 73 which extends from the cone of the cyclone body 70 so as to prevent turbulence of a flow such as recovered oil after passing through the cyclone section 62.

The specific gravity difference separating section 66 is provided with a partition plate 75 arranged in a lower part of the outer cylinder 64. This partition plate 75 separates the specific gravity difference separating section 66 from a passage 83 of the overflow section, later referred to. The spiral wall 65 arranged between the outer cylinder 64 and the inner cylinder 63 is such one that the section S thereof when cut in the vertical direction forms an angle $\alpha$ between 20° and 60° with the horizontal plane H, and preferably this angle ranges from 30° to 45°. With the angle $\alpha$ being below 20°, a highly viscous oil, for example, a viscosity of 10,000 centi-stokes or more, will stay on a lower face 65a of the spiral wall 65 and will not rise toward the accumulated liquid extracting section 67. On the contrary, with the angle $\alpha$ being 60° or more, a passage 76 defined by the spiral wall 65, the outer cylinder 64 and the inner cylinder 63 cannot extend long enough unless the pith of the spiral wall 65 is set to a small value, with the result that the machining required to fabricating the spiral wall 65 is extremely difficult. If such difficult machining is avoided, the passage 76 becomes so short that the separation of liquids cannot be made sufficiently. On the other hand, if satisfactory separation is to be achieved, the specific gravity difference separating section 66 becomes extremely high.

The accumulated liquid extracting section 67 is constituted of a cylinder 77a in a lower part, and an accumulating bath 77 formed by a cone 77b and an extracting bath 78 mounted on the cone 77b in an upper part. Nozzles 79 and 80 are disposed on a side wall surface of the cylinder 77a and on a wall surface of the cone 77b, and oil sensors 79a and 80a are inserted in the nozzles 79 and 80. The extracting bath 78 is made of a transparent or opaque material and provided with an excessive flow gate 81. Further, for extracting oil beyond this excessive flow gate 81, a pipe 82 is provided. The upper face of the extracting bath 78 is open the atmosphere.

The discharge pipe 68 of the overflow section 69 is connected to a passage 83 which communicates with a lower end opening of the inner cylinder 63. An automatic valve 84 is further disposed in the middle of the discharge pipe 68. The passage 83 is provided with a drain nozzle 85.

The separating means 61 is installed on a stand 86. A recovering pump 87 of a self-priming type is also installed on the stand 86, wherein a pipe 99 is connected to the discharge side the recovering pump 87 and the introducing port 71 of the cyclone body 70, and the discharge pipe 7 of the liquid recovering apparatus 1 is connected to the suction side of the recovering pump 87 by way of a pipe 89, thereby forming the aforementioned liquid recovering apparatus 60. Since the sectional areas of the pipe 88 and the introducing port 71 are made larger than the sectional area of the discharge pipe of the recovering pump 87, a liquid containing recovered oil and so on after passing through the recovering pump 87 abruptly decreases its flowing speed. Further, a recovered oil storage tank 90 is placed on the stand 86 for storing oil discharged from the pipe 82 of the accumulated liquid extracting section 67.

Next, the operation of the separating means 61 structured as described above will be explained.

First, when the recovering pump is started, a liquid containing recovered oil and so on collected by the liquid recovering apparatus 1 passes from the discharge pipe 7 through the hose 89 and the recovering pump 87 into the pipe 88, where the flow speed abruptly decreases, and the separation of the liquid containing recovered oil and so on into gas and liquid begins. The liquid further passes from the introducing port 71 into the cyclone section 62. Air is separated from the liquid containing recovered oil and so on by the cyclone effect of the cyclone section 62 and discharged to the outside through the air drain 72. The remaining liquid, the flow of which is protected from being disturbed by the screw 74, is transported along the introducing pipe 73 to the passage 76 of the specific gravity difference separating section 66. The recovered oil and so on are guided by the spiral wall 65 and gradually rise along the passage 76. In this process, oil with a low specific gravity is collected on the lower face 65A of the spiral wall 65 and is further collected outside the inner cylinder 63. Since the spiral wall 65 is inclined by an angle ranging from 20° to 60°, preferably from 30° to 45°, the light oil does not remain on the lower face 65a but slides thereon and rises with water having a higher specific gravity to the upper end of the specific gravity difference separating section 66, thus terminating the separation. Then, the separated oil is accumulated in the accumulating bath 77 of the accumulated oil extracting section 67. When the oil sensor 79a detects oil, the automatic valve 84 in the discharge pipe 68 is closed to prevent the liquid from overflowing from the discharge pipe 68, whereby the oil level rises beyond the excessive flow gate 81 of the extracting bath 78 and goes to the outside from the pipe 82, with the result that the oil is stored in the recovered oil storing tank 90. When the oil sensor 80a no longer detects oil, the automatic valve 84 is opened to allow the liquid to overflow from the discharge pipe 68, so that the oil level lowers to the overflow level. It should be noted that the flow of this separated oil can be viewed from the extracting bath 78. The oil having water separated therefrom enters the inner cylinder falls, and passes through the passage 83 to the discharge pipe 68 from which the oil overflows and go to the outside.

As described above in detail, according to the liquid recovering apparatus of the present invention, the level of inflow gate is previously set in accordance with a thickness liquid to be permitted to flow beyond the gate. The level of the inlet pot of the main body bath is also previously set to be always lower than the level of the inflow gate. The inflow gate always maintains the fixed level in response to variations in the liquid level and liquid density, irrespective of the main body bath. As a liquid containing low viscous oil, largely grown scum and so on approaches the main body bath, it rises along the sloping face, which is gradually sloping upwardly, to pass beyond the inflow gate into the main body bath. Thus, the liquid containing oil, scum and so on can be recovered from the discharge section below the main body bath. Therefore, even floating substances such as highly viscous oil clots, largely grown scum and so on can smoothly pass beyond the inflow gate into the main body bath, so that these floating substances can be easily recovered.

If the raking machine is provided on the sloping face of the inflow gate, floating substances remaining on the sloped surface can be raked into the main body bath, whereby the sloping face always remains in a smooth condition. It is therefore possible to constantly recover a liquid even containing hard floating substances.

If the inflow gate moves due to fluctuations in the liquid level, the raking blades also follows the movement of the inflow gate. Although the rotating section supported by the main body float does not follow the movement of the inflow gate, the rotation is transmitted to the raking blade through the coupler, so that floating substances on the sloping face are raked. In this way, even if the inflow gate moves, floating substances on the sloping face can be raked without any problem.

Also, since the rotating section rotates the pressure screw, even if the raking blades follow fluctuations in the liquid level, the rotation of the rotating section is transmitted to the raking blades, whereby floating substances on the sloping face is raked into the main body bath and sent toward the discharge section by the pressure screw. Thus, even if the inflow gate moves, floating substances on the sloping face can be raked into the main body bath and sent to the discharge section.

It is also possible to change the rotational speed of the rotating section in accordance with the kind of floating substances brought onto the inflow gate to allow recovered floating substances to smoothly flow. Therefore, the floating substances can be recovered with ease.

Further, rotation of the inflow gate results in adjusting the level thereof, which provides an easy level adjusting facility.

If part of the guide float is inserted in a recess formed in the main body float, the guide float is prevented from blocking the plane on which a liquid flows into the inflow gate, which further facilitates the recovery of floating substances.

If the discharge section is provided with a universal joint for connecting a hose thereto to recover a liquid, the shape of the connected hose will not affect the main body floats and guide floats, whereby a hose in any fixed shape may be used without causing variations in the level of the inflow gate. Thus, a hose in any fixed shape is connected to the compact liquid recovering apparatus without causing any problem.

We claim:

1. A liquid recovering apparatus comprising:
   a main container capable of floating in liquid having an inlet port and main body floats for supporting said main container in said liquid;
   an inflow gate means loosely fitted about an outer periphery of said main container, said inflow gate means having a sloping face which gradually rises toward said main container for introducing a liquid into said container through said inlet port;
   discharge means arranged in a lower part of said main container for discharging recovered liquid accumulated in said main container; and
   raking means arranged on the sloping face of said inflow gate means for raking substances floating on said sloping face into said main container.

2. A liquid recovering apparatus according to claim 1, wherein said raking means comprises:
   rotating means supported by said at least one float;
   a plurality of raking blades mounted on a rotating shaft for raking floating substances into the central portion of said sloping face; and
   means for coupling the rotating shaft of said raking blades with the shaft of said rotating means, such that said raking blades are forwardly and backwardly movable in the axial direction for a predetermined distance and also rotatable by a predetermined angular distance with respect to the axial direction for rotating said raking blades.

3. The liquid recovering apparatus according to claim 1, including a pressure screw arranged in said container for sending floating substances raked by said raking means into said main container toward said discharge means.

4. The liquid recovering apparatus according to claim 3, wherein said pressure screw is coupled to a rotating means supported by said main container, and said pressure screw is connected to either one of the rotating shaft of said rotating means and said raking means, to be forwardly and backwardly movable in the axial direction by a predetermined distance and also rotatable by a predetermined angular distance with respect to the axial direction, for transmitting rotation to said pressure screw.

5. The liquid recovering apparatus according to claim 2, wherein said rotating means is capable of rotating at variable speeds.

6. The liquid recovering apparatus according to claim 1, wherein said inflow gate means is adjustably secured to said guide floats.

7. The liquid recovering apparatus according to claim 6, wherein said discharge means is provided with a universal joint.

8. The liquid recovering apparatus according to claim 1, including separating means, comprising:
   cyclone means for separating gas components included in the recovered liquid;
   specific gravity difference separating means having an inner cylinder and an outer cylinder concentrically arranged below said cyclone means and a spiral wall arranged between said inner cylinder and said outer cylinder for separating the recovered liquid supplied thereto after passing through said cyclone means into a plurality of liquids each having a different specific gravity;
   means for accumulating liquid extract arranged on said specific gravity difference separating means for accumulating a liquid having a first specific gravity therein and discharging the accumulated liquid to the outside; and
   overflow means connecting the discharge means with said cylinder for discharging the liquid having a different specific gravity to the outside.

9. The liquid recovering apparatus according to claim 8, wherein said spiral wall is arranged such that the cross-sectional plane, when cut in the vertical direction, and the horizontal plane form an angle which ranges between 20° and 60°, and preferably between 30° and 45°.

10. The liquid recovering apparatus according to claim 8, further comprising a screw arranged between said cyclone means and said specific gravity difference separating means.

11. The liquid recovering apparatus according to claim 9, further comprising a screw arranged between said cyclone means and said specific gravity difference separating means.

* * * * *

UNITED STATES PATENT AND TRADEMARK OFFICE
CERTIFICATE OF CORRECTION

PATENT NO.  :   5,366,629
DATED       :   November 22, 1994
INVENTOR(S) :   Mori, et al.

It is certified that error appears in the above-identified patent and that said Letters Patent is hereby corrected as shown below:

Title Page [73] Assignees:  delete "Saitama, Japan", and insert --Misato City; Izumi-Souken Engineering Co., Ltd., Tokyo, Japan--

Signed and Sealed this

First Day of August, 1995

Attest:

BRUCE LEHMAN

Attesting Officer        Commissioner of Patents and Trademarks